Nov. 26, 1968     A. H. HUMPHREY     3,412,821

TRACK FOR MOTORCYCLE

Filed Sept. 9, 1966     3 Sheets-Sheet 1

INVENTOR
ALFRED H. HUMPHREY
BY
Woodhams Blanchard Flynn
ATTORNEYS

Nov. 26, 1968  A. H. HUMPHREY  3,412,821
TRACK FOR MOTORCYCLE
Filed Sept. 9, 1966  3 Sheets-Sheet 2
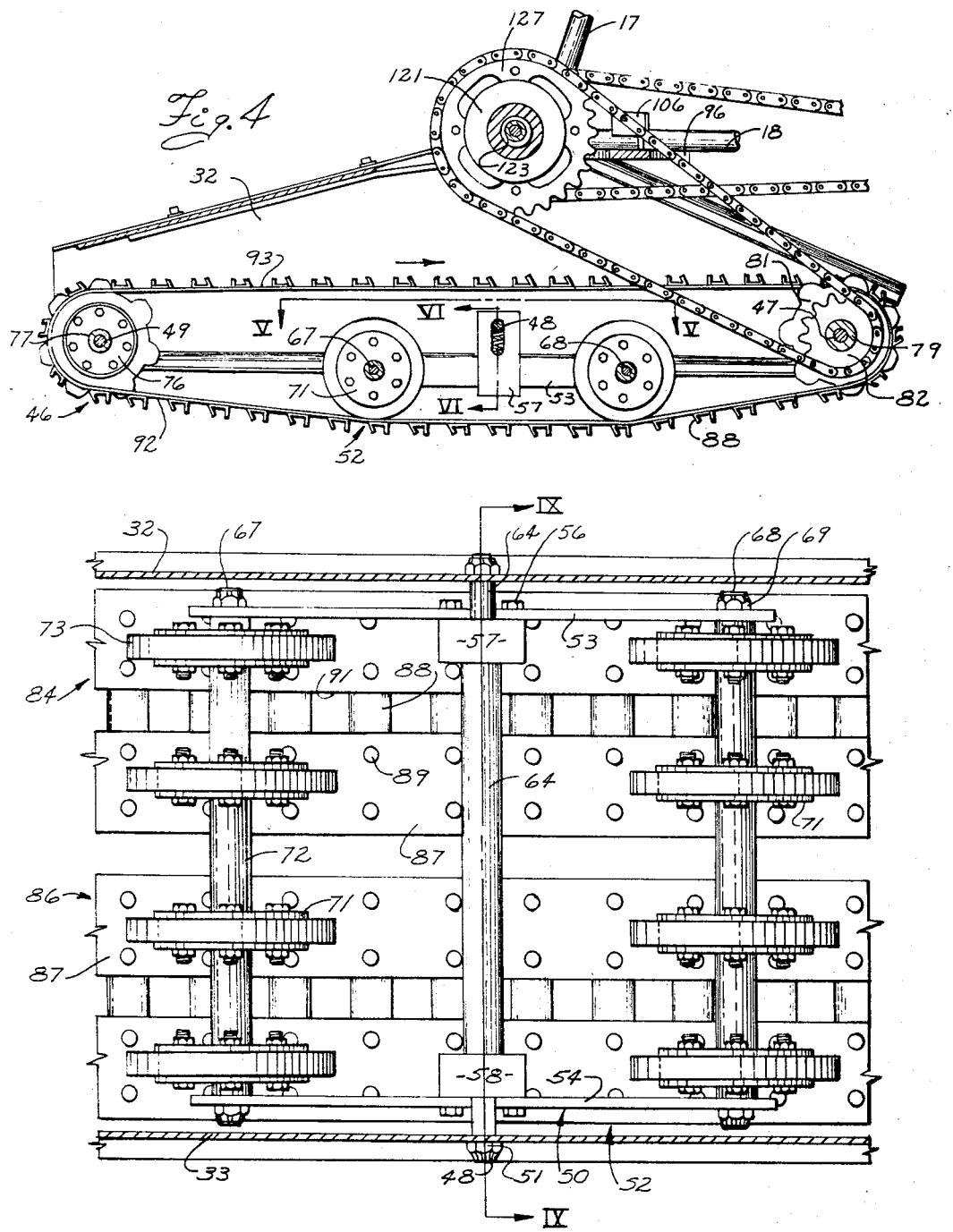
INVENTOR
ALFRED H. HUMPHREY
BY
Woodhams, Blanchard & Flynn
ATTORNEYS Nov. 26, 1968  A. H. HUMPHREY  3,412,821
TRACK FOR MOTORCYCLE
Filed Sept. 9, 1966  3 Sheets-Sheet 3
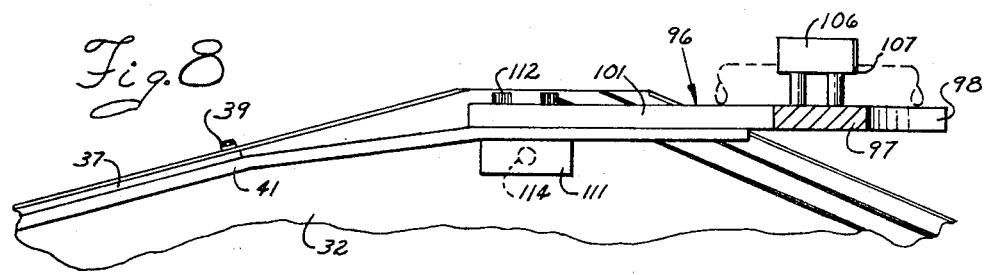
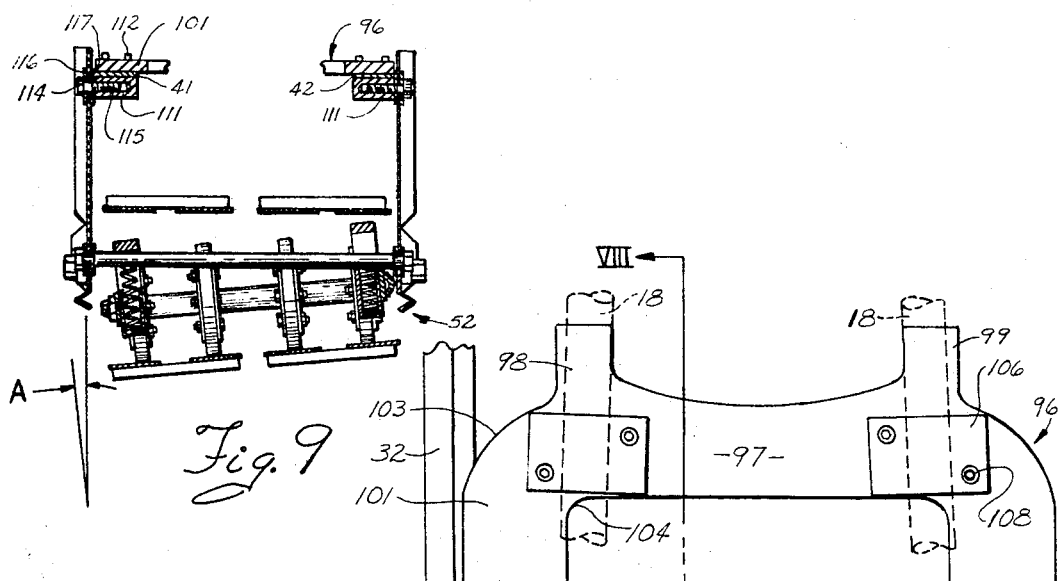
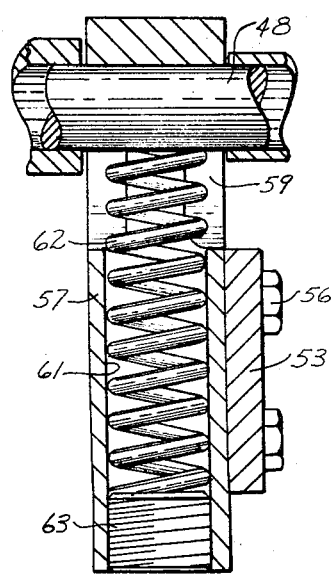
INVENTOR
ALFRED H. HUMPHREY
BY
Woodhams, Blanchard & Flynn
ATTORNEYS 3,412,821
TRACK FOR MOTORCYCLE
Alfred H. Humphrey, Kalamazoo, Mich., assignor to General Gas Light Company, Kalamazoo, Mich., a corporation of Michigan
Filed Sept. 9, 1966, Ser. No. 578,360
11 Claims. (Cl. 180—5)

ABSTRACT OF THE DISCLOSURE

A track conversion unit for a motorcycle which, upon removal of the rear wheel of the vehicle, may be fastened to the frame of the motorcycle for driving same by means of an endless track. The conversion unit is affixed to a pair of rearwardly extending frame members of the motorcycle by means of a bracket member extending laterally thereacross. The conversion unit contains a carriage having a plurality of rollers mounted thereon in rolling engagement with the inner periphery of the track. Resilient means coact between the carriage and the motorcycle housing for allowing relative transverse tilting therebetween.

---

This invention relates to a self-propelled vehicle and particularly relates to a conversion unit by which a standard self-propelled two-wheeled vehicle of the motorbicycle type may be quickly and easily converted into a vehicle of the endless track and ski type adapted for travelling on snow.

A wide variety of motorcycle and motorbicycle types of vehicles have been known for many years and have enjoyed a high level of popularity. These are however essentially vehicles adapted for dry road conditions and become either dangerous or completely inoperable when faced with snow conditions.

Vehicles intended for operating in the snow have also long been known and there has been proposed a wide variety of such vehicles, both large and small, utilizing a ski at the front or steering end and one or more endless tracks at the rear or driving end. Such vehicles have been popular both for sport and for the more utilitarian purpose of transporting people and/or goods across snow covered terrain.

Both of the foregoing-named types of vehicles have been well known and have been effective for their particular environments as above described. However, there are many instances where it is not desirable to have two vehicles and yet where it is desirable to travel by vehicles of the type described under both dry road and snow conditions. This is particularly true in climates where snow conditions, while possibly serious for a short time, last only a minor part of the year and the expense of two vehicles, whether for sport or for utilitarian purposes, as aforesaid, would not be justified. Under such conditions, it is preferable to have a single vehicle designed primarily for dry road conditions but to have also conversion means by which same may, in a manner of minutes and by only simple tools, be converted for safe, convenient, and reliable operation under snow conditions.

Accordingly, the objects of the invention include:

(1) To provide a conversion unit applicable to a two-wheeled vehicle of a motorcycle or motorbicycle type by which same may be converted for operation across snow covered terrain.

(2) To provide a conversion unit, as aforesaid, which can be applied to a standard motorbicycle of the well-known commercial type quickly and easily, by any person possessing only a minor amount of mechanical skill and by the use of only simple tools.

(3) To provide a conversion unit, as aforesaid, which is readily applicable to a two-wheeled motorbicycle, as aforesaid, and which may be removed equally quickly and easily, to allow rapid reconversion from a snow vehicle back to a dry road vehicle.

(4) To provide a conversion unit, as aforesaid, which when applied to a given vehicle to be converted will be effective, efficient, and reliable in operation and will be as safe for the operator as a vehicle built expressly for operating in snow conditions.

(5) To provide a conversion unit, as aforesaid, which is also of sufficient simplicity as to be capable of inexpensive manufacture.

(6) To provide a device, as aforesaid, which when applied to a two-wheeled vehicle of the motorbicycle type will be sturdy, capable of absorbing the bumps and shocks of normal usage and not appreciably more subject to breakdown or damage from the conditions in which it operates than other parts of the motorbicycle.

(7) To provide a conversion unit, as aforesaid, which when applied to a motorbicycle of a standard commercial type will maintain same in the same position and attitude with respect to the ground as was maintained by the wheels of said vehicle whereby an operator will operate the converted vehicle at essentially the same relationship to the ground and with essentially the same feeling as exists when said operator operates said vehicle with its wheels.

Other objects and purposes of the invention will be apparent to persons acquainted with apparatus of this general type upon reading the following specification and inspecting the accompanying drawings.

In the drawings:

FIGURE 4 is a sectional view taken along the line IV—IV of FIGURE 3.

FIGURE 5 is an enlarged sectional view taken on the line V—V of FIGURE 4.

FIGURE 6 is an enlarged central cross-sectional view taken on the line VI—VI of FIGURE 4.

FIGURE 7 is an enlarged fragment of FIGURE 2 showing a top view of the bracket used to secure the drive unit to the vehicle.

FIGURE 8 is a sectional view taken substantially on the line VIII—VIII of FIGURE 7 and showing a portion of the drive unit.

FIGURE 9 is a somewhat schematic, fragmentary sectional view taken on the line IX—IX of FIGURE 5.

Figure 1:
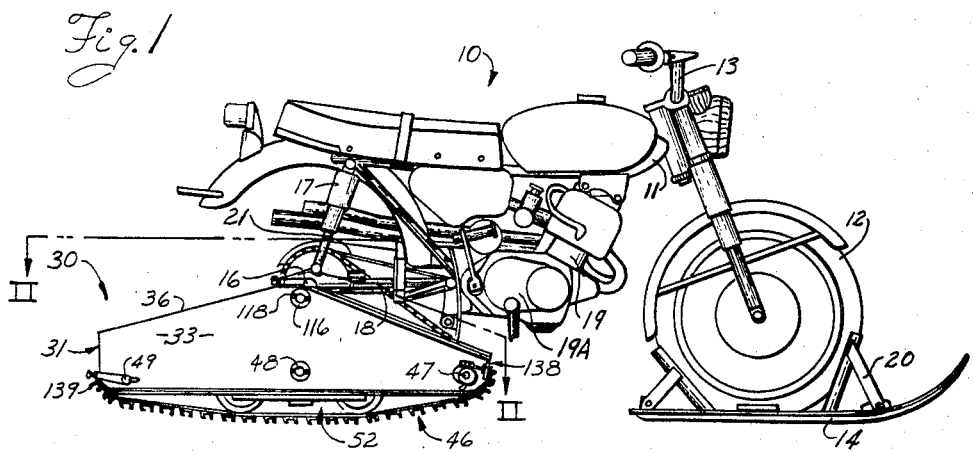
FIGURE 1 is a side elevational view of a motorbicycle equipped with a conversion unit embodying the present invention.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the directions of nomal travel of vehicle, forwardly being toward the right in FIGURE 1 and rearwardly being toward the left in FIGURE 1. The words "inwardly" and "outwardly" will refer to directions toward and away from, respectively, the geometric center of the device and designated parts thereof. Said terminology will include the words above specifically mentioned, derivatives thereof and words of similar import.

GENERAL DESCRIPTION

In general, the objects and purposes above set forth are obtained by the provision, together with any conventional runner structure for the front or steering wheel of the vehicle, of a drive unit of the endless track type which upon removal of the rear wheels of the vehicle may be fastened to the frame thereof and wherein the endless track is arranged for driving by the same means of said vehicle as is normally used to drive its rear wheel. Said drive unit is pivotally affixed to said vehicle by a pivot located closely adjacent the normal position of the rear vehicle wheel axle whereby the relationship of the drive unit to the vehicle frame is essentially the same as the relationship maintained to the frame by the vehicle wheel. Thus, the operator is able to drive the converted vehicle with the same sensation and with the same reactions as have already been developed by driving the vehicle with wheels.

DETAILED DESCRIPTION

Considering now in detail, the structure of the conversion unit comprising the invention, the particular conversion unit herein show to illustrate the invention was designed for application to a standard motorbicycle known as the Honda model CB 160. It will, however, be recognized that the principles of the invention may be modified to render same adaptable to a wide variety of other motorbicycles, both other models by the same manufacturer and various models of other manufacturer. Accordingly, it will be recognized that many specific details are herein set forth for the purposes of illustration only and will be recognized as importing no intention to restrict or narrow the invention.

Looking first at the motorbicycle by which the embodiment herein chosen to illustrate the invention is utilized, there is shown in FIGURE 1 one particular type 10 thereof. Such motorbicycle 10 is provided with a frame structure 11 pivotally mounting a front wheel 12 and steering means 13 associated therewith and is further normally provided with a rear wheel, here removed, normally rotatably mounted at the intersection of frame members 17, here a pair of spring-shock absorber units, and 18, here a pair of swing arms pivoted ahead of the members 17. In the particular embodiment shown, the rear end of each swing arm 18 forms a flattened web 16 to which the frame member 17 is attached. A motor 19 is mounted on the frame in the usual manner and normally drives the rear wheel by a suitable chain 21. All of this, however, is well known so that a detailed description thereof is not necessary.

Turning now to the conversion means comprising the subject matter of the present invention, there is provided a runner 14 for the front wheel which may be any of many well-known devices, such as the runner structure shown in U.S. Patent No. 504,265. The runner 14 is fixed to the front wheel by brackets 20 and by suitable straps or the like, not shown, for supporting same and for turning with the steering means 13 to effect suitable steering of the vehicle.

The driving unit 30 which functionally replaces the rear wheel of the vehicle 10 is somewhat more complex. The driving unit 30 (FIGURES 1, 2 and 3) comprises a track support housing 31 which is located adjacent and below the rearward end of the frame member 18 of the motorcycle 10. The housing 31 comprises a pair of parallel side plates 32 and 33 which extend longitudinally of the vehicle 10. The side plates 32 and 33 are preferably symmetrically opposites. The side plates 32 and 33 are shaped generally as triangles of short altitude, having generally horizontal, elongated base edges and truncated corners. If desired, the forward upper edges as well as the lower edges of the plates 32 and 33 may be rolled as indicated to increase the rigidity thereof. The upper edges 36 on the rearward portion of the side plates 32 and 33 are flanged inwardly toward each other as indicated at 37. A planar track guard 38 extends between side plates 32 and 33, the flanges 37 overlying the outer edges of the guard 38 and being rigidly affixed thereto by any convenient means, here screws 39.

A horizontally spaced pair of leaf springs 41 and 42 extend along the inner faces of the side plates 32 and 33, respectively, adjacent the rearward upper edges thereof and are fixed beneath the other edge zones of the planar snow guard 38 by the afore-mentioned screws 39. The leaf springs 41 and 42 extend forwardly beyond the forward edge of the snow guard 38 into the central area of the drive unit 30.

A track assembly generally indicated at 46 (FIGURES 2, 3 and 4) is disposed within and extends below the housing 31. The track assembly 46 includes a forward shaft 47, an intermediate shaft 48 and a rearward shaft 49 which are spaced in parallelism along and above the lower edges of the side plates and extend between the side plates 32 and 33. Each of the shafts 47, 48 and 49 preferably has threaded outer ends which extend through suitable openings in the side plates and receive nuts 51 thereon to secure same to the side plates 32 and 33.

The track assembly further includes a central suspension unit 52 (FIGURES 4 and 5). The suspension unit 52 comprises a carriage 50 including a pair of opposed bars 53 and 54 spaced and centered beneath the intermediate shaft 48, the bars 53 and 54 being spaced closely adjacent to the respective side plates 32 and 33 and extending longitudinally thereof. Screws 56 secure generally upstanding spring blocks 57 and 58 to the opposed faces of the bars 53 and 54, respectively, preferably at the center thereof. The spring blocks 57 and 58 are preferably identical and extend upwardly from the bars 53 and 54. The spring blocks 57 and 58 each have a vertically elongated transverse opening 59 therethrough through which the intermediate shaft 48 is snugly received for limited vertical sliding movement. Each of the spring blocks 57 and 58 has a vertical hole 61 (FIGURE 6) therein communicating between the bottom of said block and the shaft opening 59. A helical compression spring 62 is slideably disposed in the hole 61 and retained therein by a threaded plug 63 removably disposed in the lower end of such hole. The spring 62 bears against the underside of shaft 48 to urge same upwardly away from the bottom of the opening 59 for purposes appearing hereinafter. Spacers 64 are preferably snugly telescoped on the intermediate shaft 48 to maintain fixed separation of the spring blocks 57 and 58 from each other and from side plates 32 and 33.

Transverse load bearing shafts 67 and 68 (FIGURES 4 and 5) extend between the rearward and forward ends, respectively, of the bars 63 and 64. The ends of the shafts 67 and 68 are threaded and extend through suitable holes, not shown, in said bars and are affixed to such bars by nuts 69. The shafts 67 and 68 normally parallel the afore-mentioned shafts 47, 48, 49 and are normally spaced therebelow by a distance somewhat exceeding the vertical travel of the blocks 57 and 58 with respect to the shaft 48. Shafts 67 and 68 are preferably spaced at equal distances from the blocks 57 and 58.

A plurality of rollers 71, here four, are carried by each of the shafts 67 and 68. The rollers 71 are equipped with bearings of any convenient type, not shown, which enable same to rotate freely with respect to said shafts 67 and 68. The rollers 71 are transversely fixedly spaced along their respective shafts by any convenient means such as spacers 72, the spacing between the outer pairs of rollers 71 on each shaft being usually equal. The rollers 71 are each provided with a smooth, circular, rim defining portion, preferably of a resilient material such as rubber. Thus, the suspension unit 52 may move vertically upwardly with respect to the shaft 48 against the urging of the springs 62, may pivot about the axis of shaft 48 and may tilt at an angle (as in FIGURE 9) to the shaft 48 by compressing one of the springs 62. In the latter mode, it will be seen that the plane defined by the shafts 67 and 68 will be inclined with respect to that of shafts 47, 48 and 49.

The rearward shaft 49 carries a pair of idler wheels 76 supported for rotation thereon by any convenient bearing means, not shown. The idler wheels 76 are centered between corresponding ones of the outward pairs of rollers 71 on shafts 67 and 68 and are held in such position by suitable spacers generally indicated at 77 (FIGURES 3 and 4) on the shaft 49. The rim portions of the idler wheels 76 are preferably of a tough and relatively hard material such as hard rubber and are provided with a plurality of relatively large, radially outwardly extending lugs 78 for purposes appearing hereinafter.

The forward shaft 47 is provided with a hub 79 rotatably supported thereon by any convenient means and extending substantially the length thereof between the side plates 32 and 33. The hub 79 fixedly supports a pair of spaced drive wheels 81 preferably identical to and aligned with the corresponding ones of the idler wheels 76. A sprocket 82 is fixed to the hub 79 for rotatably driving said hub and drive wheels.

The drive unit 30 further includes a pair of endless belt-type tracks 84 and 86 (FIGURES 2 through 5) which are preferably identical. In the particular embodiment shown, each track comprises a pair of flexible endless webs 87 which are transversely closely spaced and are joined together by a plurality of evenly spaced, transversely extending cleats 88. The cleats 88 are generally channel-shaped and are secured to the outer faces of the webs by any convenient means such as rivets 89. The tracks 84 and 86 are carried in longitudinally extending, transversely closely spaced relation between the side plates 32 and 33 of the housing 31. More particularly, the tracks 84 and 86 are centered on and are looped around the outwardly facing portions of corresponding ones of the drive wheels 81 and idler wheels 76, the outer pairs of the rollers 71 of the central suspension unit 52 riding on the inner faces of the lower reaches 92 of the corresponding tracks 84 and 86. The lugs 78 of the idler wheels 76 and the corresponding lugs of the drive wheels 81 extend outwardly through spaced openings 91 in the tracks, such openings being bound longtudinally by the opposed surfaces of adjacent cleats 88 and transversely by the opposed edges of the pair of webs 87 of the track. Thus, the webs cannot move sideways past the lugs of the drive and idler wheels which maintain the tracks in centered alignment with respect thereto and the lugs of the drive wheels bear upon the trailing edges of the cleats to rotate the tracks therewith. Each of the four rollers 71 on each of the shafts 67 and 68 rides and is preferably centered on its own one of the webs 87, one of the rollers 71 on the shafts 67 and 68 aligned longitudinally of the housing 31 bearing on the same web 87. The suspension rollers 71, supported by the lower reach of the tracks, in turn support the intermediate shaft 48 and thereby support the drive unit 30. Inasmuch as the rollers 71 and wheels 76 and 81 are generally similar in size and the rollers 71 are located below wheels 76 and 81, the upper reaches 93 of the tracks are normally spaced above the rollers 71. The portions of the tracks engaging the idler and drive wheels are normally raised somewhat above the ground. The tracks 84 and 86 are sufficiently spaced from each other as to provide clearance on either side of the sprocket 82.

Turning now to the manner in which the drive unit 30 is affixed to the motorcycle 10, there is provided a generally H-shaped bracket 96 (FIGURES 2, 7 and 8), in the particular embodiment shown constructed from a flat plate of substantial thickness (approximately one-half inch thick). The bracket 96 includes a transversely extending cross element 97 which is preferably convexly curved along its forward edge to clear a drive chain hereinafter described running to the sprocket 82. Relatively short integral stub portions 98 and 99 extend forwardly from the cross element 97 adjacent the outer ends thereof, said stub portions 98 and 99 being positioned to fall directly beneath the swing arms 18 of the motorcycle 10 for purposes appearing hereinafter. Rearwardly extending legs 101 and 102 are integral with the cross element 97 at the outer ends thereof and are displaced transversely outwardly from the stub portions 98 and 99. The legs 101 and 102 are preferably substantially wider and longer than the stub portions 98 and 99 so as to be capable of carrying the full load of weight of the rearward end of the motorcycle 10 in normal used thereof in a cantilevered manner.

The forward corners of the cross element 97 are preferably rounded as indicated at 103 for the safety of the vehicle operator and/or passenger. The inner edges of the legs 101 and 102 preferably join the central element 97 in a radius 104 to strengthen the bracket 96. It will be noted that the upper surfaces of legs 101 and 102 may be used as foot rests for a passanger on the motorcycle 10.

The bracket 96 is affixed to and beneath the swing arms 18 of the motorcycle 10 by mounting blocks 106 which are provided, as seen in FIGURE 8, with downwardly facing grooves 107 for partially receiving the upper faces of said swing arms 18. The blocks 106 are secured to the bracket 96 by screws 108, the screws 108 of each block 106 straddling the corresponding swing arm and holding same tightly between the mounting block and the opposed surface of the bracket 96. The mounting blocks 106 are positioned above the cross element 97 adjacent the rearward edge thereof and in longitudinal alignment with respective stub portions 98 and 99 and are located at a distance forwardly of the joint between the motorcycle frame elements 17 and 18. Since the stub portions 98 and 99 underlie the swing arms 18 and portions of the legs 101 and 102 at least partially underlie the swing arms 18 so as to bear against the swing arms at points well spaced from the blocks 106, there can be no rocking of the bracket 96 with respect to the swing arms 18.

The rearward ends of the legs 101 and 102 are preferably widened transversely outwardly as indicated at 109. The forward ends of the upwardly and forwardly angled springs 41 and 42 above discussed extend beneath the corresponding legs 101 and 102, respectively, almost to the cross element 97. Pivot blocks 111 are disposed beneath the rearward ends of the legs 101 and 102 and are separated therefrom by the springs 41 and 42. Each pivot block 111 threadedly receives the ends of screws 112 inserted through suitable holes, not shown, in the rearward ends of the legs 101 and 102 and in the adjacent portions of the springs 41 and 42 disposed therebelow, the screws 112 and pivot blocks 111 thus holding the forward ends of the springs 41 and 42 firmly against the undersides of the corresponding legs.

Suitable pivot axles 114 (FIGURE 9), here comprising large diameter socket head shoulder screws, extend through transversely opposed openings, not shown, in the side plates 31 and 32 and are threadedly engaged in suitable threaded openings 115 in the pivot blocks 111. The axles 114 extend through flat, washer-like bushings 116 and 117 which are preferably affixed to the outer and inner faces of each of the side plates 31 and 32 by any convenient means such as the small screws indicated at 118 in FIGURE 1. The pivot axles 114 and thereby the blocks 111, bracket 96 and rear end of the motorcycle 10 are thus pivotally supported by bushing 116 and 117 on the side plates 31 and 32 of the dive unit 30. The springs 41 and 42 allow the bracket 96 and side plates to pivot relative to each other but resiliently limit the angle through which the bracket 96 can pivot with respect to the side plates 31 and 32.

A drive hub 121 is mounted by bearings 123 (FIGURE 4) for rotation on an axle 122. The axle 122 is provided with a radially enlarged head 124 (FIGURE 3) at one end thereof. The axle 122 is insertable through suitable slots, not shown, in the webbed portions 16 of the swing arms 18, the hub 121 being disposed between such webs. A nut 126 secures the axle and hub securely in place with respect to the swing arms 18. The hub 121 and axle 122 thus are carried by the vehicle 10 in the place of corresponding parts of the removed rear vehicle wheel.

Figure 2:
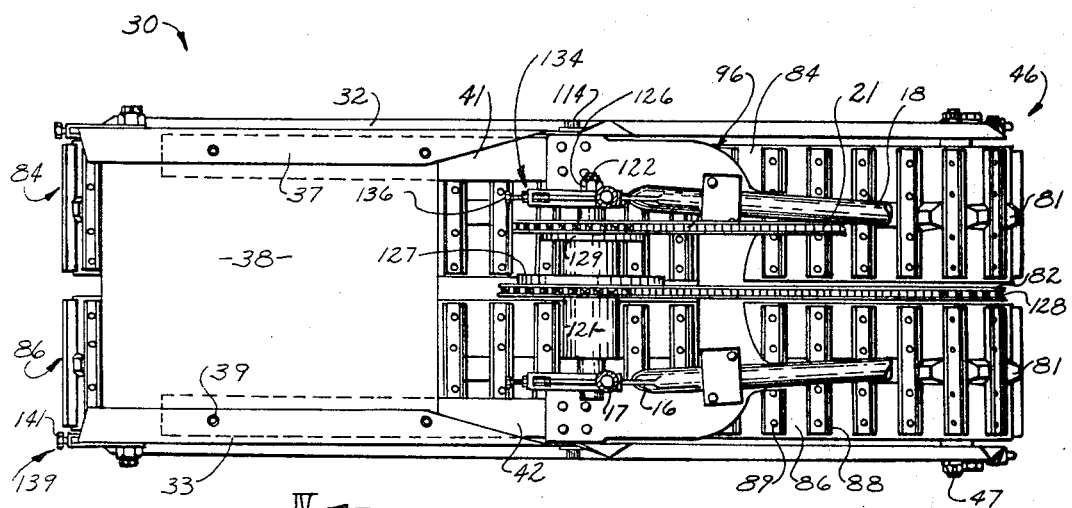
FIGURE 2 is an enlarged sectional view taken on the line II—II of FIGURE 1 and disclosing a top view of the drive unit of the conversion unit.
Figure 3:
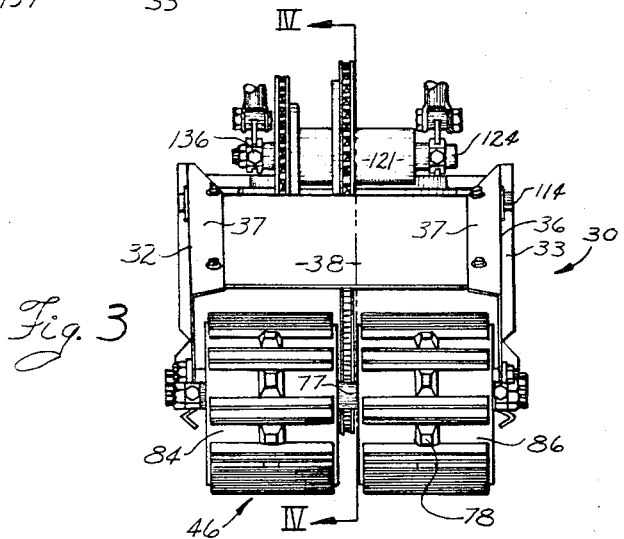
FIGURE 3 is a rear elevational view of the drive unit of FIGURE 2.

A drive sprocket 127 (FIGURES 2, 3, and 4 is fixed to the hub 121 for rotation therewith and is connected by means of a chain loop 128 to the sprocket 82 on the forward shaft 47 of the drive unit 30. A driven sprocket 129 is fixed to the hub 121 for rotation therewith, such driven sprocket being positioned on the hub 121 as the usual driven sprocket on the normal rear wheel of the motorcycle 10 and preferably being identical in size thereto. The afore-mentioned chain 21 is preferably used to drive the driven sprocket 129 from the motor 19. Thus, there is provided through chains 21 and 128 and the hub 121 interposed therebetween a positive drive from the motor 19 of the motorcycle 10 to the forward shaft 47 and, hence, the drive wheels 81 of the tracks 84 and 86 to move the motorcycle 10 forwardly. As a result of the relatively small diameter of the driving wheels 81 compared to the diameter of the normal rearward wheel of the motorcycle, the speed of the track equipped vehicle 10 will be normally lower than that of the conventional two-wheeled motorcycle even when, as in FIGURE 4, the ratio of diameters of sprockets 127 and 82 is greater than one. In the particular embodiment shown, the maximum speed of the track equipped vehicle is approximately half that of the conventional vehicle i.e., about 35 m.p.h.

The motorcycle 10 is normally provided with suitable tensioning devices 134 for tensioning the chain 21 thereof, such devices gripping the axle 122 at each of the webs 16. Such tensioners are well known in the art and include screws 136 extending rearwardly from and engaging the webs 16 and adjustable to move the axle 126 toward and away from the motor 19 upon loosening of the axle holding nut 126 to adjust the tension of the chain 21. In a similar manner, tensioning means 138 are preferably provided between the forward shaft 47 and the side plates 32 and 33. Thus, said forward shaft may be adjusted forwardly and rearwardly through a short distance afforded by clearance in the holes in the side plate through which said forward shaft extends by loosening of the shaft nuts 51 and by manipulation of the tensioning means 138 so as to properly tension the chain 127. Further tensioning means 139 are preferably provided for the rearward shaft 49 in a similar manner whereupon by loosening of the nuts holding same to the side plates 32 and 33, the forward-rearward location of said shaft may be adjusted as allowed by clearance in the holes in the side plates 32 and 33 through which it extends so as to properly tension the tracks 84 and 86.

OPERATION

Although the operation of the device embodying the invention will be apparent on the above description, same will be reviewed hereinbelow to insure a complete understanding of the invention. With the drive unit 30 and ski 14 installed as shown, it being contemplated that under certain conditions the ski might not be required, the operator drives the vehicle essentially in the same manner as he would the conventional two-wheeled vehicle. However, the drive unit 30 enables the vehicle 10 to be operated under much more adverse conditions than would be possible with the unconverted two-wheeled vehicle such as in loose sand or relatively deep snow or other material incapable of supporting high unit pressure loadings or incapable of providing reasonable levels of traction.

It will further be noted that the drive unit 30 supports the rearward end of the unloaded vehicle 10 substantially at and here slightly above that which it would occupy when supported by the conventional rear wheel.

Motorcycles of the type described generally include a change gear transmission 19A integral with the motor 19 for driving the chain 21. Thus, shifting of the ratio of the transmission 19A will effect corresponding changes in the speed at which the vehicle is driven by the tracks just as is the case with the rear wheel installed.

Although a brake is not shown in the drawings, it is fully contemplated that one may be incorporated in the hub 121, it being further contemplated that the hub 121 may, for example, simply comprise the stock hub of an extra rear wheel designed for the motorcycle 10 with the spokes and rims removed and with the further drive sprocket 127 mounted thereon by any convenient means.

Considering the operation of the drive unit 30 in detail, power is supplied to the tracks 84 and 86 through chain 21, hub 121, chain 127 and the drive wheels 81, the lugs of the drive wheels 81 engaging the trailing edges of the cleats 88 and propelling same in a clockwise direction as seen in FIGURE 4 whereby the lower reaches 92 of the tracks 84 and 86 more rearwardly to propel the vehicle forwardly. The intermediate portion of the lower reach 92 is forced against the ground by the rollers 71 on shafts 67 and 68, said shafts carrying the weight of the drive unit 52 and, thus, of the rearward portion of the vehicle 10. This weight acts with the broad surface of the webs 86 and gripping ability of the cleats 88 to propel the vehicle forwardly even under extremely adverse conditions. In addition, the large surface area of the lower reaches 92 of tracks 84 and 86 readily supports the weight of the rearward end of the vehicle, and thereby the majority of the loaded vehicle, distributing such weight over a sufficient area as to provide a relatively low unit pressure loading on the supporting ground to reduce any tendency for the vehicle to sink into deep snow or the like.

As the vehicle is driven through relatively rough terrain, shocks to the vehicle are absorbed in several ways. First, the suspension system of the vehicle itself, here taking the form of telescopic spring-shock absorber units 17 provides for vertical movement of the rearward end of the vehicle with respect to the track unit. In addition, the springs 62 of the suspension unit 52 allow limited resiliently retarded downward movement of the housing of the drive unit 30 with respect to the lower reach of the tracks and with respect to the suspension unit 52. Also, the resilient rollers 71 absorb some of the shocks. Further, the drive unit 30 is free to pivot about the axles 114 through a limited range and against the resilient retarding force of leaf springs 41 and 42 to accommodate surface irregularities in the path of the tracks 84 and 86 while maintaining a substantial area in the lower reaches 92 in driving contact with the ground.

It will be noted that because the independent springing of the two sides of the suspension unit 52, the two sides of the suspension unit may be at different heights with respect to the axle 48 which allows the lower reach of one of the tracks 84 and 86 to rise above or fall below the lower reach of the other track to allow transverse accommodation of surface irregularities in the vehicle path. Thus, a substantial portion of the lower reaches of both tracks will remain in ground-engaging contact despite surface irregularities in the ground being covered.

It should further be noted that particular mounting of the suspension unit 52 with respect to intermediate shaft 48 allows the lower reaches of the tracks to remain horizontal while the remainder of the drive unit and the vehicle 10 tilt sidewardly through an angle A (FIGURE 9) so that the motorcyclist may bank the vehicle 10 when rounding a curve as he would normally on a conventional motorcycle 10. Thus, the handling of the vehicle 10 as sensed by its operator will be essentially the same with either the drive unit 30 or the conventional rear wheel installed. Further, the converted vehicle 10 may thus negotiate relatively sharp turns without abnormal slowing as would tend to be the case if the vehicle 10 could not be banked while turning. The deformation of the tracks during banking is sufficiently small compared to the length thereof as to be absorbed by slight stretching of the webs or by a slight amount of slack in the tracks.

The vehicle 10 is readily converted from operation as a conventional two-wheeled vehicle to its tracked state shown in the drawings by at least for some machines removal of the conventional center stand, shaft and brake pedal (not shown) as well as by removal of the rear wheel thereof and replacement thereof with the hub 121, the standard chain 21 of the vehicle 10 being, in the preferred embodiment shown, of proper length for driving the driven sprocket 129 fixed to the hub 121. Proper tensioning of the chain 21 may be obtained, if necessary, by adjusting the tensioning units 131 provided with the motorcycle, although this would not be required if the driven sprocket is of the same size as the sprocket of the removed wheel. The remainder of the drive unit 30 may readily be installed, assuming the bracket 96 to be secured by the stub axles 114, by placing such drive unit beneath the rearward end of the vehicle 10 with the bracket 96 positioned below the shaft 122 of hub 121 at its rearward end and extending forwardly therefrom beneath the swing arms 18, the drive unit 30 being centered on and longitudinally aligned with the motorcycle 10. Thereafter, the mounting blocks 106 may be placed on top of the swing arms 18 ahead of the webs 16 thereof and secured thereto by the screws 108 so as to firmly sandwich intermediate portions of the swing arms 18 between said mounting blocks 106 and the portions 98 and 99 and legs 101 and 102. Assuming the chain 128 to be already engaging sprocket 127 to sprocket 82, the installation of drive unit 30 is thus completed. On the first installation of the drive unit 30 on the vehicle 10 it may be necessary to adjust the tensioning means 138 and 139 to provide proper track tension and to provide proper tensioning of the chain 128. Depending on the brand of motorcycle, an unswept exhaust system may be required to clear the drive unit 30. The drive unit 30 is readily removed and replaced by the standard rear wheel of the motorcycle 10 by simple reversal of the above steps. It will be noted that such conversion can be accomplished quickly and readily by persons having a minimum of mechanical skill and with the use of only simple and widely available tools.

The ski 14, when used, may be secured in place or removed quickly and readily, any convenient means such as straps or the like being used to secure same to the front wheel of the vehicle 10.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In an apparatus for converting a two-wheeled motorcycle to operate in snow or the like, said motorcycle having laterally spaced rearwardly extending frame members and having means for mounting a rear wheel, the combination comprising:
    bracket means including a bracket member extending between and fixedly interconnected to said rearwardly extending frame members at a position spaced from the rear wheel mounting means, said bracket means also having a portion extending rearwardly from the point of attachment of said bracket means to said rearwardly extending frame members;
    a housing and means pivotally mounting said housing on the rearwardly extended portion of said bracket means for supporting the rear end of said motorcycle in the absence of the rear wheel thereof;
    an endless track and means rotatably supporting said track with respect to said housing; and
    means for driving said track from the motor of said motorcycle to propel said motorcycle.

2. The device defined in claim 1 in which said bracket member comprises a planar member having a transversely extending cross element, a pair of forwardly extending stub portions integral with said cross element and disposed adjacent the ends thereof for underlying the rearwardly extending frame members on either side of the motorcycle, said bracket member further including a pair of elongated legs extending rearwardly from the ends of the transverse cross element, said legs extending transversely outwardly beyond said frame members of said motorcycle, the rearward ends of said legs being secured pivotally to said housing; and further including
    mounting block means disposed above said rearwardly extending frame members of said motorcycle and secured to said bracket member and said cross element, said mounting blocks clamping said frame members rigidly to said bracket member.

3. The device defined in claim 2 in which said stub portions, and portions of said legs disposed on the opposite side of said mounting blocks as said stub portions, contact and are positively forced against said frame members by said mounting blocks to prevent rocking of said mounting block with respect to said frame members about a transverse axis.

4. The device defined in claim 1 in which said means pivotally mounting said housing on the rearwardly extending portion of said bracket means comprises pivot blocks rigidly affixed to the rearwardly extending portion of the bracket means and axle means extending transversely outwardly from said blocks and through the side walls of said housing for pivotally mounting said housing with respect thereto.

5. The device defined in claim 4 including leaf spring means fixed at one portion thereof to said housing at points displaced from said pivot blocks and at other portions fixed with respect to said bracket means and said pivot blocks for limiting pivotal moving of said housing around the axis defined by said pivot axles.

6. The device defined in claim 1 in which said bracket member has front portions positioned adjacent said rearwardly extending frame members on opposite sides of the motorcycle, said bracket member further having a pair of rearwardly extending elongated legs positioned on opposite sides of the motorcycle, said housing being pivotably secured to each of said legs; and
    means interconnecting said bracket member to said rearwardly extending frame members for fixedly securing said bracket means to said frame members.

7. Apparatus for converting a two-wheeled motorcycle having a driving wheel and a motor for driving same for operation in snow, comprising:
    a housing and means pivotally mounting same on said motorcycle adjacent the mounting for the drive wheel thereof and in place of such drive wheel;
    an endless track and means including spaced end wheels supporting said track with respect to said housing;
    suspension means coacting between said track and housing for allowing relative tilting movement between said track and said housing transversely of said motorcycle;
    said suspension means including a support frame positioned between said end wheels and having a portion thereof extending laterally across said track;
    said suspension means further including resilient means coacting between said housing and said support frame for allowing relative transverse tilting of said portion of said support frame relative to said housing whereby said track also tilts transversely relative to said housing; and
    means for driving said track from said motor to propel said motorcycle.

8. The device defined in claim 6 in which said housing includes a pair of side plates disposed on either side of said motorcycle adjacent the rearward end thereof, said side plates being connected by transverse shielding along upper edges thereof and by a plurality of transversely extending shafts spaced along the lower edges thereof, one of said shafts supporting the track between and in spaced relation to said housing.

9. The device defined in claim 6 in which said support frame comprises a carriage having a pair of transversely spaced bars located adjacent the sides of said housing, said carriage including shaft means for carrying a plurality of rollers bearing upon the lower reach of said track and supported on said bars, means adjacent the center of said bars for defining a pair of transversely aligned, substantially vertically extended openings and further defining substantially vertically extending holes communicating with such openings, said holes being provided with axially acting springs extending upwardly into said elongated openings, said housing including transverse shaft means vertically slideably disposed in said elongated openings and engaged and vertically supported by said springs whereby tilting movement of the housing with respect to the track results in displacement of said shaft means at least in one of said elongated openings and is resiliently resisted by the axial force of the compressed one of said springs.

10. The device defined in claim 7, in which said support frame of said suspension means comprises a carriage having a pair of transversely extending, substantially parallel shaft means and longitudinally extending means interconnecting said shaft means, said suspension means further including a plurality of rollers supported upon said shaft means and bearing upon the lower reach of said track, said resilient means comprising spring means positioned near the opposite lateral sides of said carriage and coacting between said carriage and said housing for permitting transverse tilting of said carriage including said shaft means relative to said housing.

11. The device defined 10 in which said suspension means also allows relative pivotable movement between said suspension means and said housing longitudinally of said motorcycle.

References Cited

UNITED STATES PATENTS

| | | | |
|---|---|---|---|
| 1,568,241 | 1/1926 | Rimailho | 305—27 X |
| 2,475,250 | 7/1949 | Petersen. | |
| 3,077,238 | 2/1963 | Nelson | 180—9.24 X |
| 3,285,676 | 11/1966 | Hetteen | 305—27 |
| 3,309,150 | 3/1967 | Marier | 305—27 |
| 3,318,043 | 5/1967 | Hansen | 180—9.24 X |
| 3,336,994 | 8/1967 | Pederson | 180—9.24 |
| 3,362,492 | 1/1968 | Hansen | 180—9.24 X |

FOREIGN PATENTS 462,279    3/1951    Italy.

RICHARD J. JOHNSON, *Primary Examiner.*